United States Patent
Nikam et al.

(10) Patent No.: US 11,615,504 B2
(45) Date of Patent: Mar. 28, 2023

(54) METHODS AND APPARATUS FOR SCALABLE PRIMITIVE RATE ARCHITECTURE FOR GEOMETRY PROCESSING

(71) Applicant: QUALCOMM Incorporated, San Diego, CA (US)

(72) Inventors: Vishwanath Shashikant Nikam, Bangalore (IN); Kalyan Kumar Bhiravabhatla, Bengaluru (IN); Suvam Chatterjee, Bangalore (IN); Siva Satyanarayana Kola, Bangalore (IN); Abhishek Lal, Bengaluru (IN); Andrew Evan Gruber, Arlington, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/229,697

(22) Filed: Apr. 13, 2021

(65) Prior Publication Data
US 2022/0327654 A1 Oct. 13, 2022

(51) Int. Cl.
*G06T 1/20* (2006.01)
*G06T 1/60* (2006.01)
*G06T 15/00* (2011.01)

(52) U.S. Cl.
CPC .................. *G06T 1/20* (2013.01); *G06T 1/60* (2013.01); *G06T 15/005* (2013.01)

(58) Field of Classification Search
CPC ............ G06T 1/20; G06T 1/60; G06T 15/005

USPC .................................................. 345/505, 506
See application file for complete search history.

(56) References Cited

U.S. PATENT DOCUMENTS

| 8,704,836 B1 | 4/2014 | Rhoades et al. |
| 2014/0078156 A1* | 3/2014 | Carroll ...................... G06T 1/60 345/505 |
| 2016/0055608 A1* | 2/2016 | Frascati ................ G06T 15/005 345/522 |

OTHER PUBLICATIONS

Anonymous: "Tessellation—OpenGL Wiki", May 23, 2017 (May 23, 2017), XP055375512, pp. 1-11, Retrieved from the Internet: URL: https://www.khronos.org/opengl/wiki/Tessellation [retrieved on May 23, 2017].

(Continued)

*Primary Examiner* — Jacinta M Crawford
(74) *Attorney, Agent, or Firm* — Procopio, Cory, Hargreaves & Savitch LLP

(57) ABSTRACT

The present disclosure relates to methods and devices for graphics processing including an apparatus, e.g., a GPU. The apparatus may receive a plurality of indices for each of a plurality of primitives. The apparatus may also determine a size of each of a plurality of primitive batches, each of the plurality of primitive batches including at least one primitive of the plurality of primitives. Additionally, the apparatus may divide, based on the determined size of each of the plurality of primitive batches, the plurality of primitives into the plurality of primitive batches. The apparatus may also distribute each of the plurality of primitive batches to each of a plurality of geometry slices, each of the plurality of geometry slices including one or more primitives of the plurality of primitives.

28 Claims, 12 Drawing Sheets

(56) References Cited

OTHER PUBLICATIONS

Anonymous: "Vertex Rendering—OpenGL Wiki", Jan. 24, 2016, XP055374109, URL: https://www.khronos.org/opengl/wiki/Vertex_Rendering [retrieved on May 18, 2017], 13 pages.
International Search Report and Written Opinion—PCT/US2022/020457—ISA/EPO—dated Jun. 20, 2022.

\* cited by examiner

METHODS AND APPARATUS FOR SCALABLE PRIMITIVE RATE ARCHITECTURE FOR GEOMETRY PROCESSING

TECHNICAL FIELD

The present disclosure relates generally to processing systems and, more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A GPU of a device may be configured to perform the processes in a graphics processing pipeline. Further, a display processor or display processing unit (DPU) may be configured to perform the processes of display processing. However, with the advent of wireless communication and smaller, handheld devices, there has developed an increased need for improved graphics or display processing.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a graphics processing unit (GPU) or any apparatus that can perform graphics processing. The apparatus may determine a visibility of each of a plurality of primitives, where a plurality of indices for each of the plurality of primitives is received based on the visibility of each of the plurality of primitives. The apparatus may also receive a plurality of indices for each of a plurality of primitives. The apparatus may also fetch the plurality of indices for each of the plurality of primitives. Additionally, the apparatus may determine a size of each of a plurality of primitive batches, each of the plurality of primitive batches including at least one primitive of the plurality of primitives. The apparatus may also divide, based on the determined size of each of the plurality of primitive batches, the plurality of primitives into the plurality of primitive batches. The apparatus may also distribute each of the plurality of primitive batches to each of a plurality of geometry slices, each of the plurality of geometry slices including one or more primitives of the plurality of primitives. Further, the apparatus may process each of the plurality of geometry slices including the one or more primitives. The apparatus may also shade each of the plurality of geometry slices including the one or more primitives. Moreover, the apparatus may rearrange a slice order of the plurality of geometry slices, such that at least one of the plurality of geometry slices corresponds to an updated position in the slice order. The apparatus may also rasterize each of the plurality of primitives based on the slice order of the plurality of geometry slices.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
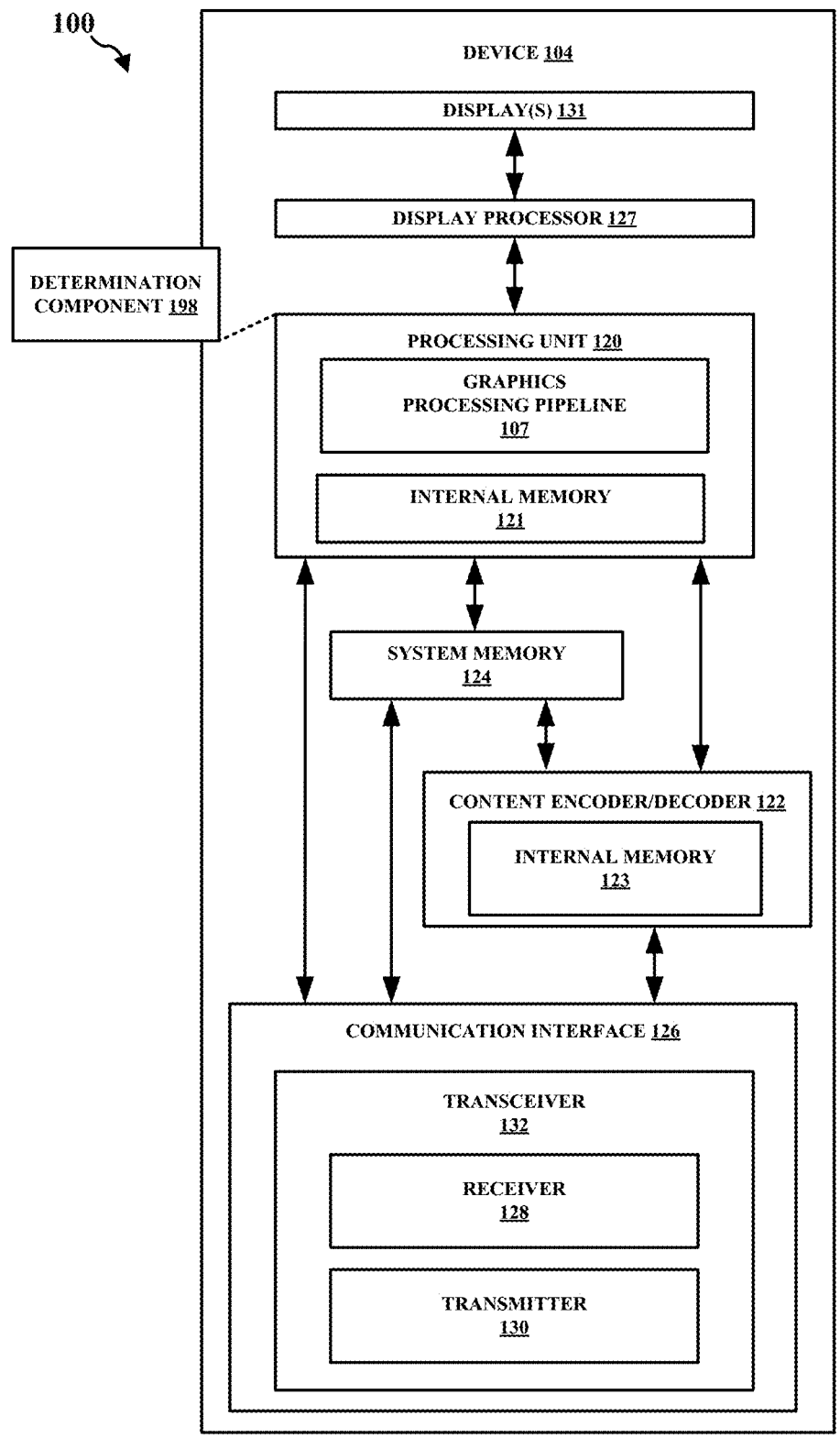
FIG. 1 is a block diagram that illustrates an example content generation system in accordance with one or more techniques of this disclosure.

There are a number of issues that may be encountered when designing scalable geometry processing hardware. For instance, the variable size of a drawcall (i.e., a work unit) and adaptive workload expansion in the middle of the geometry pipeline are some issues that may occur when designing scalable geometry processing hardware. Workloads across different drawcalls may vary, so tying each drawcall to a geometry slice may create uneven data downstream. Another issue that may be encountered when designing scalable geometry processing hardware is visibility handling (e.g., tiled rendering) across multiple geometry slices. As indicated herein, in tile-based rendering, the screen is divided into multiple bins, and a binning pass is used to generate a per-bin visibility stream (i.e., primitives that may be identified as visible in a bin). Because of different visibilities of primitives, the workload pattern in each bin-rendering pass may vary significantly from a binning pass. A workload distribution scheme may ensure that an even workload (including amplification) is distributed to each geometry slice (even when accounting for the potential disparity in visibility). Another issue that may be encountered when designing scalable geometry processing hardware is an application program interface (API) specification to support a primitive restart index or cut index. In some instances, an API (e.g., OpenGL or DirectX) may utilize hardware to support a primitive restart. Also, a primitive restart may allow application developers to stop a current mesh in the middle of a drawcall (i.e., a work unit) and restart a new mesh from an arbitrary index. This may create a challenge in designing scalable geometry processing hardware, as a work distribution logic may be aware of an arbitrary location where a new mesh starts. Aspects of the present disclosure may evenly distribute a GPU workload across independently working hardware modules. Aspects of the present disclosure may also provide for scalable geometry processing hardware for differently sized drawcalls and/or adaptive workload expansions. Moreover, aspects of the present disclosure may provide for scalable geometry processing hardware for visibility handling or tiled rendering across multiple geometry slices. Aspects of the present disclosure may also provide for scalable geometry processing hardware in order to support a primitive restart.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a determination component 198 configured to determine a visibility of each of a plurality of primitives, where a plurality of indices for each of the plurality of primitives is received based on the visibility of each of the plurality of primitives. The determination component 198 may also be configured to receive a plurality of indices for each of a plurality of primitives. The determination component 198 may also be configured to fetch the plurality of indices for each of the plurality of primitives. The determination component 198 may also be configured to determine a size of each of a plurality of primitive batches, each of the plurality of primitive batches including at least one primitive of the plurality of primitives. The determination component 198 may also be configured to divide, based on the determined size of each of the plurality of primitive batches, the plurality of primitives into the plurality of primitive batches. The determination component 198 may also be configured to distribute each of the plurality of primitive batches to each of a plurality of geometry slices, each of the plurality of geometry slices including one or more primitives of the plurality of primitives. The determination component 198 may also be configured to process each of the plurality of geometry slices including the one or more primitives. The determination component 198 may also be configured to shade each of the plurality of geometry slices including the one or more primitives. The determination component 198 may also be configured to rearrange a slice order of the plurality of geometry slices, such that at least one of the plurality of geometry slices corresponds to an updated position in the slice order. The determination component 198 may also be configured to rasterize each of the plurality of primitives based on the slice order of the plurality of geometry slices. Although the following description may be focused on graphics processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
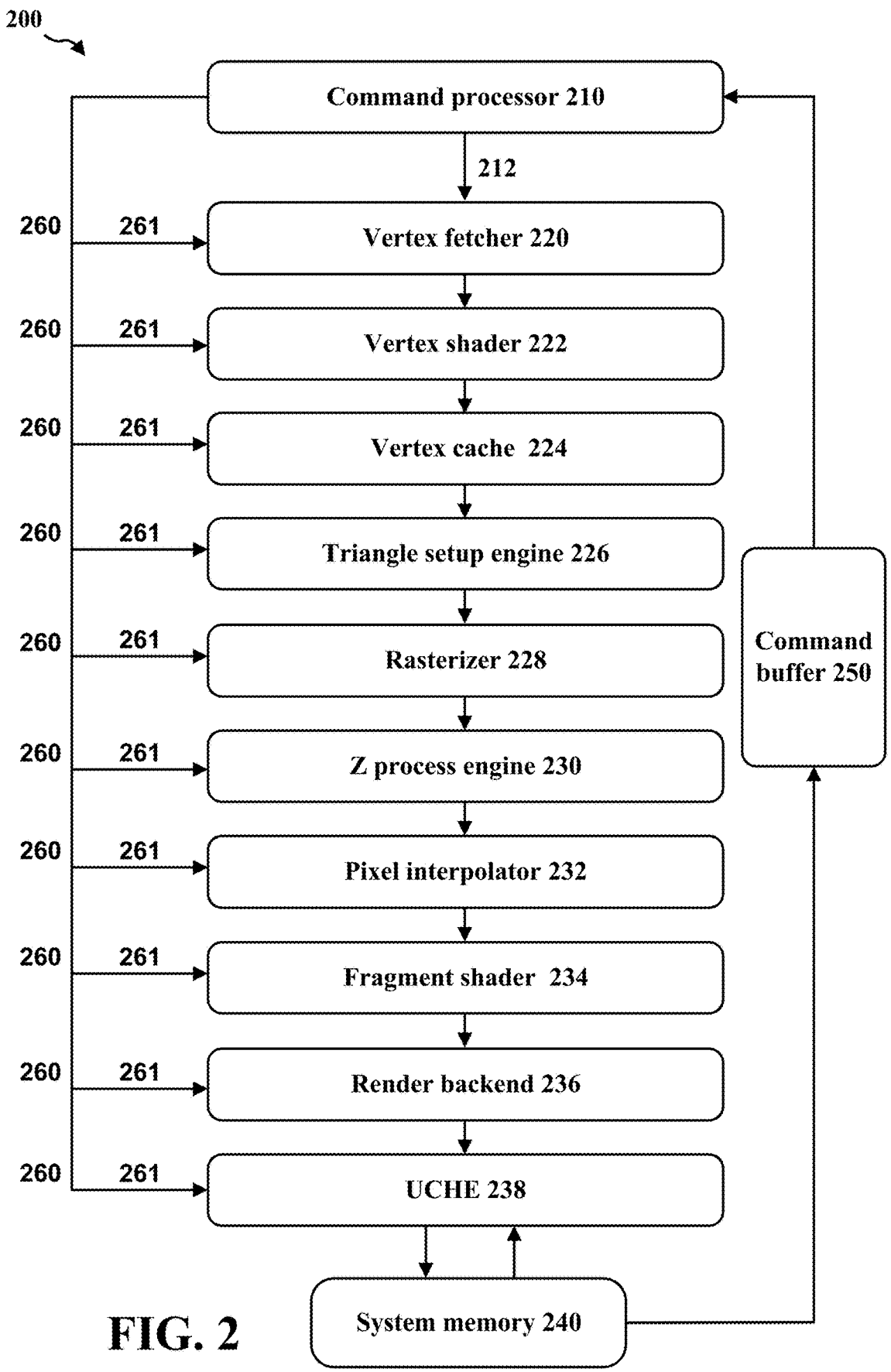
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 2 (L2) cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured in the following manner: context register of context N, draw call(s) of context N, context register of context N+1, and draw call(s) of context N+1.

GPUs can render images in a variety of different ways. In some instances, GPUs can render an image using rendering and/or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects, during a binning pass, an image can be divided into different bins or tiles. In some aspects, during the binning pass, a visibility stream can be constructed where visible primitives or draw calls can be identified. In contrast to tiled rendering, direct rendering does not divide the frame into smaller bins or tiles. Rather, in direct rendering, the entire frame is rendered at a single time. Additionally, some types of GPUs can allow for both tiled rendering and direct rendering.

In some aspects, GPUs can apply the drawing or rendering process to different bins or tiles. For instance, a GPU can render to one bin, and perform all the draws for the primitives or pixels in the bin. During the process of rendering to a bin, the render targets can be located in the GMEM. In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a visibility or bin-visibility pass and a rendering or bin-rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitive in each bin or area, e.g., in a system memory. This visibility information can be used to determine or generate a visibility stream. In a rendering pass, the primitives in each bin can be rendered separately. In these instances, the visibility stream can be fetched from memory used to drop primitives which are not visible for that bin.

Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

Figure 3:
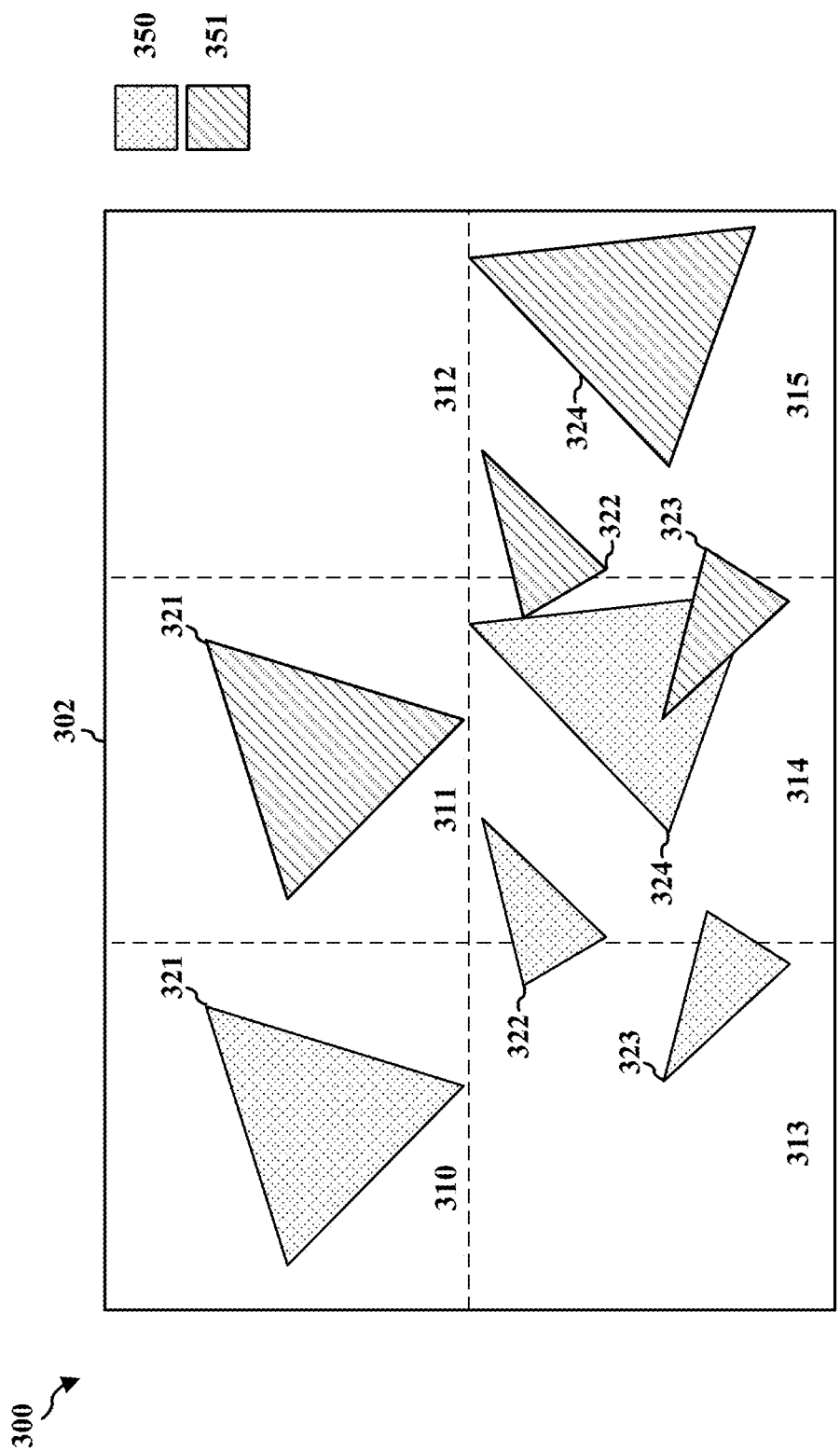
FIG. 3 illustrates an example image or surface in accordance with one or more techniques of this disclosure.

FIG. 3 illustrates image or surface 300, including multiple primitives divided into multiple bins. As shown in FIG. 3, image or surface 300 includes area 302, which includes primitives 321, 322, 323, and 324. The primitives 321, 322, 323, and 324 are divided or placed into different bins, e.g., bins 310, 311, 312, 313, 314, and 315. FIG. 3 illustrates an example of tiled rendering using multiple viewpoints for the primitives 321-324. For instance, primitives 321-324 are in first viewpoint 350 and second viewpoint 351. As such, the GPU processing or rendering the image or surface 300 including area 302 can utilize multiple viewpoints or multi-view rendering.

As indicated herein, GPUs or graphics processor units can use a tiled rendering architecture to reduce power consumption or save memory bandwidth. As further stated above, this rendering method can divide the scene into multiple bins, as well as include a visibility pass that identifies the triangles that are visible in each bin. Thus, in tiled rendering, a full screen can be divided into multiple bins or tiles. The scene can then be rendered multiple times, e.g., one or more times for each bin.

In aspects of graphics rendering, some graphics applications may render to a single target, i.e., a render target, one or more times. For instance, in graphics rendering, a frame buffer on a system memory may be updated multiple times. The frame buffer can be a portion of memory or random access memory (RAM), e.g., containing a bitmap or storage, to help store display data for a GPU. The frame buffer can also be a memory buffer containing a complete frame of data. Additionally, the frame buffer can be a logic buffer. In some aspects, updating the frame buffer can be performed in bin or tile rendering, where, as discussed above, a surface is divided into multiple bins or tiles and then each bin or tile can be separately rendered. Further, in tiled rendering, the frame buffer can be partitioned into multiple bins or tiles.

In some aspects of graphics processing, GPU hardware may be divided into multiple sections, e.g., hardware for geometry processing and hardware for pixel processing. Scalable GPU hardware may be desirable in order to meet different throughputs across various market segments. Also, in some aspects, scalable hardware for pixel processing may be designed in a variety of ways. For instance, a screen may be divided into different parts and multiple pixel processing hardware modules (i.e., slices) may work independently on different parts of the screen. By changing the number of pixel slices, a scalable throughput may be achieved for different tiers. However, designing scalable geometry processing hardware has an inherent challenge of evenly distributing the workload across independently working hardware modules (i.e., geometry slices).

There are a number of issues that may be encountered when designing scalable geometry processing hardware. For instance, the variable size of a drawcall (i.e., a work unit) and an adaptive workload expansion in the middle of the geometry pipeline are some issues that may occur when designing scalable geometry processing hardware. Workloads across different drawcalls may vary, so tying each drawcall to a geometry slice may create uneven data downstream. Apart from this, an application program interface (API) may specify that a geometry pipeline may support adaptive workload expansion/reduction through different features, e.g., tessellation, geometry shading, and/or triangle culling.

Figure 4:
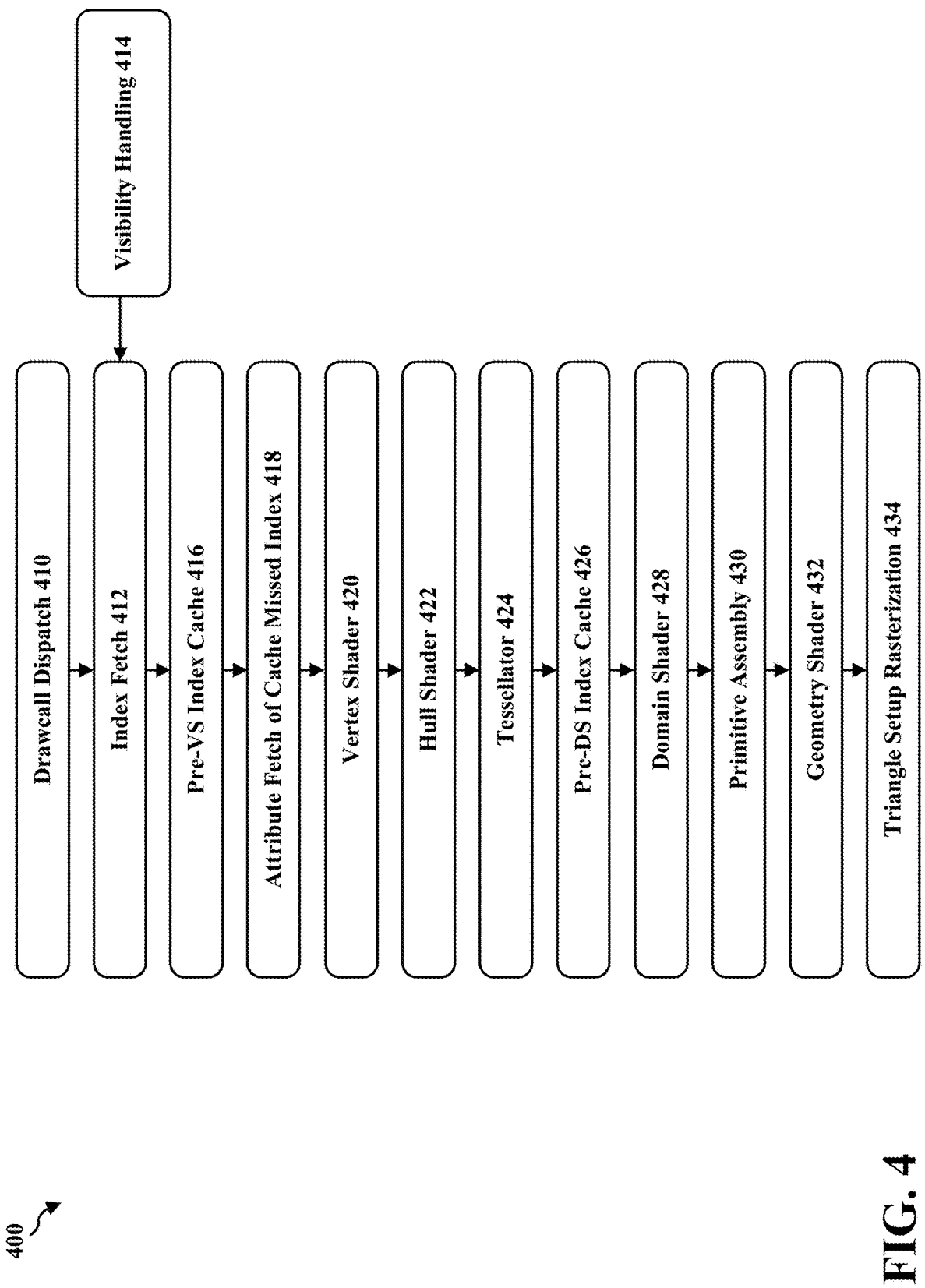
FIG. 4 is a diagram illustrating an example geometry pipeline in a GPU in accordance with one or more techniques of this disclosure.

FIG. 4 is a diagram 400 illustrating an example geometry pipeline in a GPU. As depicted in FIG. 4, diagram 400 includes a drawcall dispatch 410, an index fetch 412, a visibility handling step 414, a pre-vertex shader index cache 416, an attribute fetch of a cache missed index 418, a vertex shader 420, a hull shader 422, a tessellator 424, a pre-domain shader index cache 426, a domain shader 428, a primitive assembly 430, a geometry shader 432, and a triangle setup rasterization 434. As shown in FIG. 4, after an index fetch 412, each primitive may be expanded to create multiple primitives, where an amplification factor may be determined during run-time. As such, sending primitives to different modules without considering an amplification factor may create an unequal workload in a downstream pipeline. Accordingly, this may prevent the achievement of an optimal throughput.

Another issue that may be encountered when designing scalable geometry processing hardware is visibility handling (e.g., tiled rendering) across multiple geometry slices. As indicated above, in tile-based rendering, the screen is divided into multiple bins, and a binning pass is used to generate a per-bin visibility stream (i.e., primitives that may be identified as visible in a bin). Also, the visibility stream may be used in multiple bin-rendering passes (e.g., dropping invisible primitives from processing) to render the whole screen. Because of different visibilities of primitives, the workload pattern in each bin-rendering pass may vary significantly from a binning pass. A workload distribution scheme may need to ensure that an even workload (including amplification) is distributed to each geometry slice (even when accounting for the potential disparity in visibility).

Another issue that may be encountered when designing scalable geometry processing hardware is an API specification to support a primitive restart index or cut index. In some instances, an API (e.g., OpenGL or DirectX) may utilize hardware to support a primitive restart. Also, a primitive restart may allow application developers to stop a current mesh in the middle of a drawcall (i.e., a work unit) and restart a new mesh from an arbitrary index. This may create a challenge in designing scalable geometry processing hardware, as a work distribution logic may need to be aware of an arbitrary location where a new mesh starts.

Based on the above, it may be beneficial to evenly distribute a GPU workload across independently working hardware modules. It may also be beneficial to provide for scalable geometry processing hardware for differently sized drawcalls and/or adaptive workload expansions. Further, it may be beneficial to provide for scalable geometry processing hardware for visibility handling or tiled rendering across multiple geometry slices. It may also be beneficial to provide for scalable geometry processing hardware in order to support a primitive restart.

Aspects of the present disclosure may evenly distribute a GPU workload across independently working hardware modules. Aspects of the present disclosure may also provide for scalable geometry processing hardware for differently sized drawcalls and/or adaptive workload expansions. Moreover, aspects of the present disclosure may provide for scalable geometry processing hardware for visibility handling or tiled rendering across multiple geometry slices. Aspects of the present disclosure may also provide for scalable geometry processing hardware in order to support a primitive restart.

As indicated herein, aspects of the present disclosure may include geometry pipelines that allow for variably sized drawcalls and/or adaptive workload expansions. These geometry pipelines may include a number of different features, such as a centralized index fetch, a visibility handling prior to index distribution, and/or an index distribution to a number of geometry slices, e.g., N geometry slices. In some instances, this may include an independent shader operation or a reordering of primitives across a number of geometry slices, e.g., N geometry slices, and/or transmitting to a triangle setup engine or a rasterizer unit.

In geometry architecture in aspects of the present disclosure, an index fetch may be centralized. Further, indices may be fetched based on a primitive type in a drawcall. In some aspects, a sequential index fetch may be readily scalable to support a workload specification of a certain amount of geometry slices, e.g., N geometry slices. As such, aspects of the present disclosure may include a centralized index fetch and a distribution architecture that may enable a workload distribution after a visibility check. By doing so, this may create a fair distribution of workload that includes a number of visible primitives. This is an advantage for the present disclosure over distributed index fetch architectures where the visibility of primitives may create an imbalance in a workload.

Aspects of the present disclosure may also allow for an index distribution to a number of geometry slices, e.g., N geometry slices. In some instances, a core geometry pipeline (e.g., a pre-vertex shader index cache, a tessellator, a pre-domain shader index cache, or a primitive assembly) may be instantiated a certain amount of times, e.g., N times, in order to achieve a certain throughput, e.g., a throughput of N primitives/clk. Also, a centralized index distributor may distribute the workload to multiple slices in a load balanced fashion. Here, load balance may be achieved by a centralized index distributor that may keep track of active primitive batches in each geometry slice. Further, a throughput conversion buffer may be attached to each slice in order to support throughput conversion.

Figure 5:
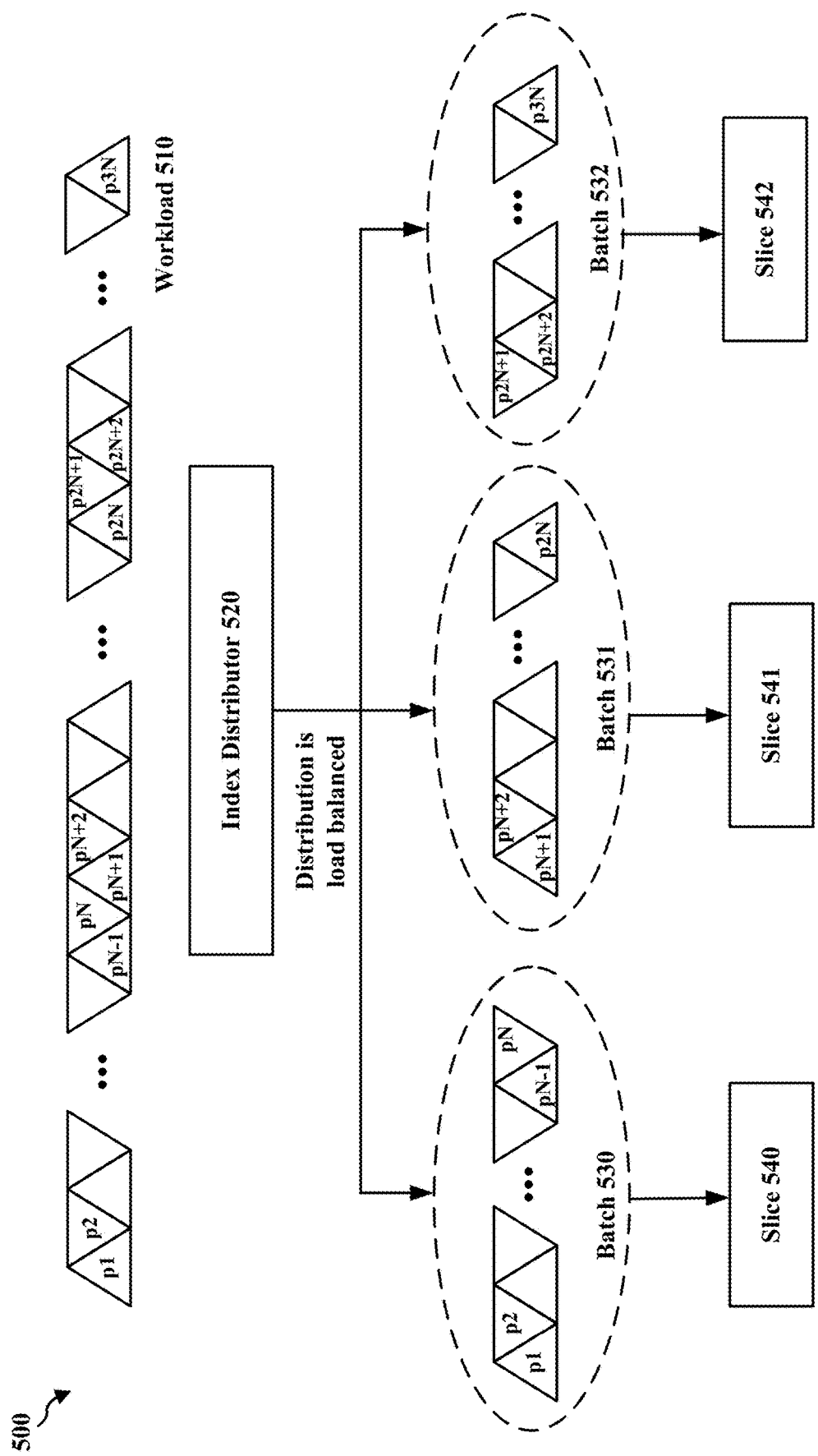
FIG. 5 is a diagram illustrating an example primitive batch distribution process in accordance with one or more techniques of this disclosure.

FIG. 5 is a diagram 500 illustrating an example primitive batch distribution process in accordance with one or more techniques of this disclosure. More specifically, diagram 500 in FIG. 5 depicts an example primitive batch distribution to multiple geometry slices. Diagram 500 includes a primitive workload 510 including a plurality of primitives (e.g., p1, p2, pN−1, pN, pN+1, pN+2, p2N, p2N+1, p2N+2, p3N, etc.), an index distributor 520, a number of primitives in multiple batches, e.g., batch 530, batch 531, batch 532, and multiple geometry slices, e.g., slice 540, slice 541, slice 542. For instance, index distributor 520 may distribute the primitive workload 510 to multiple geometry slices, e.g., slice 540, slice 541, slice 542, in an orderly fashion. FIG. 5 shows that the distribution may be in a load balanced manner.

As shown in FIG. 5, aspects of the present disclosure may create independent batches of primitives and send these batches to different geometry slices. The batch size may vary for each drawcall, such as based on the type of workload present in the drawcall. Also, each batch may have a start indication and an end indication. The start indication may carry information to start a fresh batch in a geometry slice (i.e., initial values of certain variables). The end indication may carry information regarding where the next batch is to be sent. The batches may be reordered down the pipeline based on the end of batch information.

In some aspects of the present disclosure, for adaptive workload expansion cases (e.g., geometry shader and tessellation), a proposed distribution algorithm may be efficient in ensuring that workloads are evenly distributed. In some tessellation workloads with a multi-pass tessellation solution, a first pass algorithm may ensure that a hull shader workload is distributed evenly among the geometry slices by adjusting the batch size depending on input/output control points. A second pass algorithm may determine the amplification per patch and distribute the patch to either a same slice or multiple slices. Each slice may work independently on separate portions of a patch as indicated by a centralized distributor. Further, aspects of the present disclosure may not need a crossbar post-tessellation stage. Additionally, for geometry shader cases, some algorithms of the present disclosure may consider a workload expansion during the primitive distribution. Also, these algorithms may adaptively change the input primitive batch size.

Figure 6:
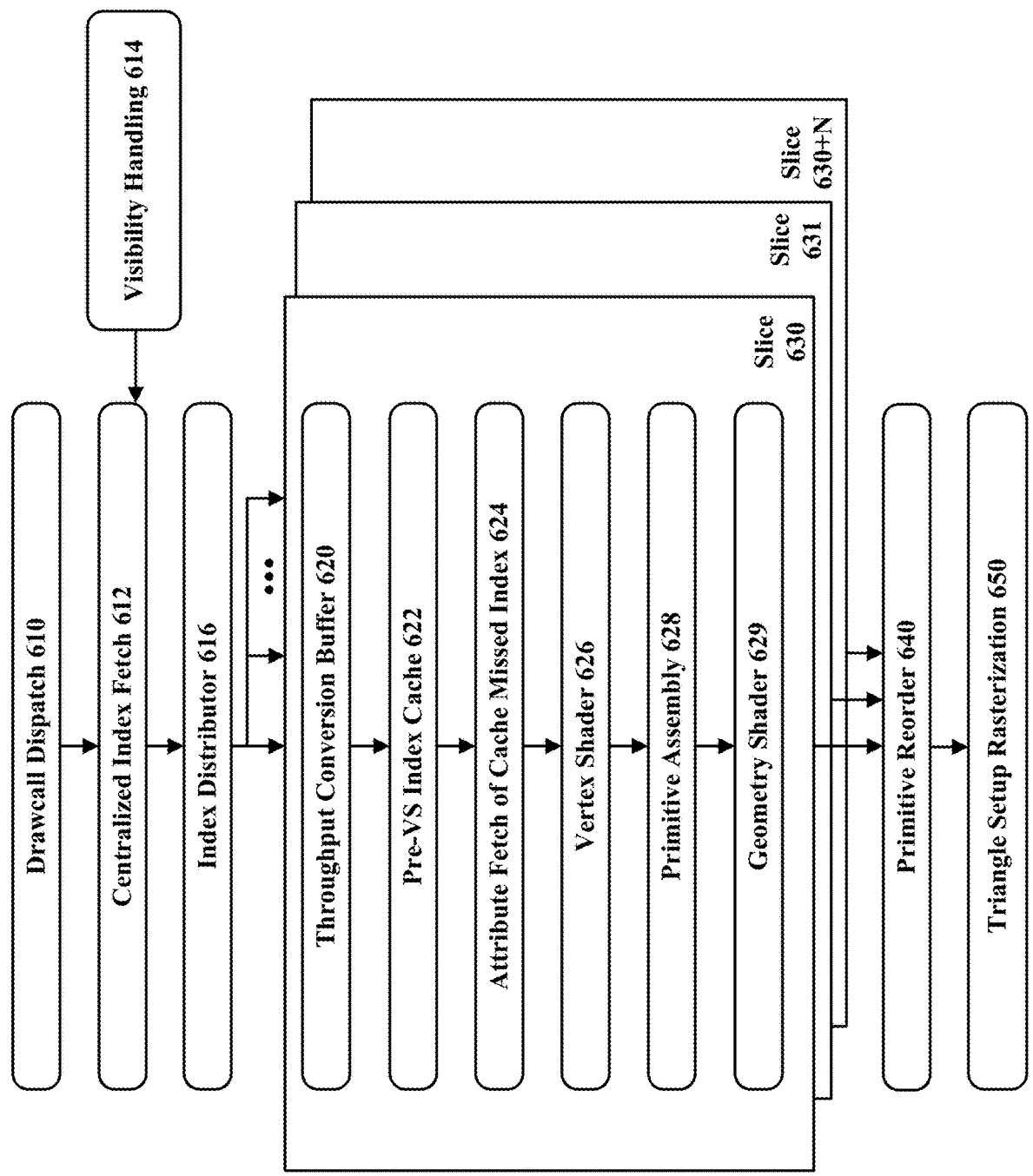
FIG. 6 is a diagram illustrating an example geometry pipeline in a GPU in accordance with one or more techniques of this disclosure.

FIG. 6 is a diagram 600 illustrating an example geometry pipeline in a GPU in accordance with one or more techniques of this disclosure. As shown in FIG. 6, diagram 600 includes drawcall dispatch 610, a centralized index fetch 612, a visibility handling step 614, an index distributor 616, a throughput conversion buffer 620, a pre-vertex shader index cache 622, an attribute fetch of a cache missed index 624, a vertex shader 626, a primitive assembly 628, a geometry shader 629, a primitive reorder step 640, and a triangle setup rasterization 650. Diagram 600 also includes multiple geometry slices, e.g., slice 630, slice 631, and slice 630+N.

Specifically, diagram 600 includes a geometry pipeline for a vertex shader (VS) mode or a geometry shader (GS) mode. For instance, diagram 600 includes a vertex shader enabled workload (i.e., a one-to-one mapped transformation). As shown in FIG. 6, for a VS enabled workload, a batch size may be a trade-off between performance and area. For example, a smaller batch size may result in a reduction in an overall cache hit percentage. However, a larger batch size may also necessitate a larger re-order buffer and/or throughput conversion buffer.

Figure 7B:
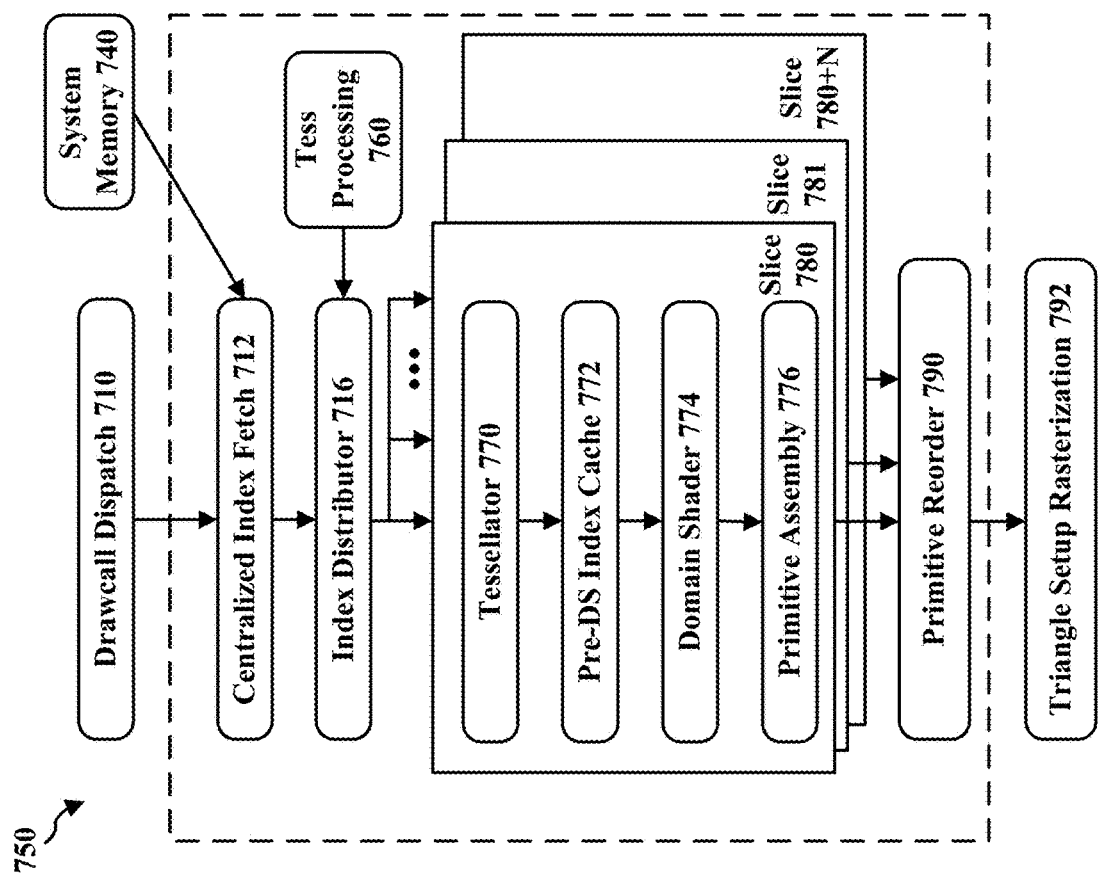
FIG. 7B is a diagram illustrating an example geometry pipeline in a GPU in accordance with one or more techniques of this disclosure.
Figure 7A:
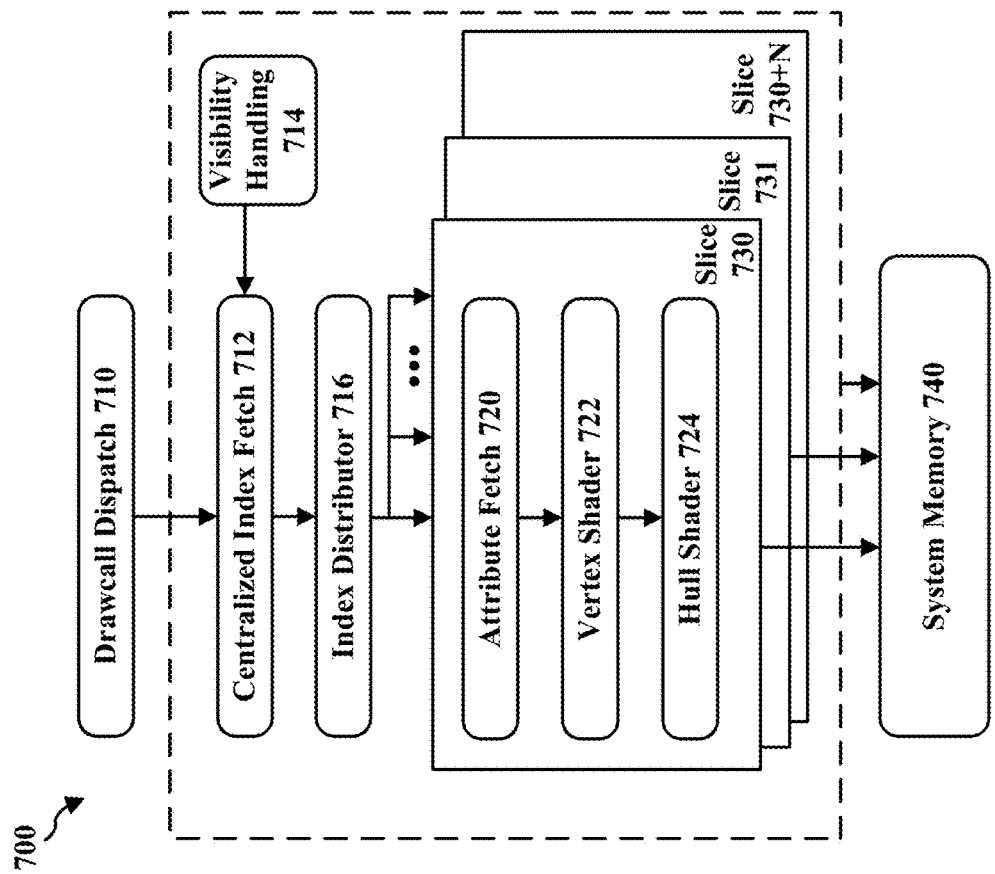
FIG. 7A is a diagram illustrating an example geometry pipeline in a GPU in accordance with one or more techniques of this disclosure.

FIGS. 7A and 7B are diagrams 700 and 750, respectively, illustrating example geometry pipelines in a GPU in accordance with one or more techniques of this disclosure. As shown in FIG. 7A, diagram 700 includes drawcall dispatch 710, a centralized index fetch 712, a visibility handling step 714, an index distributor 716, an attribute fetch 720, a vertex shader 722, a hull shader 724, and a system memory 740. Diagram 700 also includes multiple geometry slices, e.g., slice 730, slice 731, and slice 730+N. As shown in FIG. 7B, diagram 750 includes drawcall dispatch 710, a centralized index fetch 712, an index distributor 716, a system memory 740, tessellation processing step 760, tessellator 770, pre-domain shader index cache 772, domain shader 774, primitive assembly 776, primitive reorder step 790, and triangle setup rasterization 792. Diagram 750 also includes multiple geometry slices, e.g., slice 780, slice 781, and slice 780+N.

Diagrams 700 and 750 display a geometry pipeline for a vertex shader (VS)-hull shader (HS) (VS-HS) mode or a domain shader (DS) mode. Diagram 700 in FIG. 7A corresponds to a first pass (pass 1) of the geometry pipeline and diagram 750 in FIG. 7B corresponds to a second pass (pass 2) of the geometry pipeline. As shown in FIGS. 7A and 7B, in a merged shader, same shader hardware may be used to process VS-HS and DS workloads in a sequential manner. As shown in FIG. 7A, first patches may be processed in a vertex shader, followed by a hull shader (i.e., pass 1) and a number of factors, e.g., patch constant factors, output control point (OCP) factors, or tessellation factors, may be written out to memory. As shown in FIG. 7B, in pass 2, tessellation factors may be fetched and fed to a tessellator block (e.g., a specified fixed hardware algorithm) to generate primitives. Next, the primitives may be cache-checked and sent to the domain shader (DS).

As shown in FIGS. 7A and 7B, a centralized batch distribution may be performed separately at a patch level granularity for pass 1 (e.g., VS-HS mode) and a primitive level granularity for pass 2 (e.g., DS mode). For a HS workload, the batch size may be aligned to input/output a number of control points per patches and a wave size (i.e., a granularity of a shader workload). For a DS workload, the batch size may be a trade-off between performance and area. For instance, each geometry slice may perform the tessellation process independently.

In some aspects, in order to handle a distribution of a non-uniform workload, tessellation factors of a patch may be fetched and a total number of sub-primitives per patch may be computed. The patch (i.e., tessellation factors) may be sent to multiple geometry slices with one batch per slice, such as based on the number of batches to be created from amplification. Along with the tessellation factors, multiple parameters may be sent to each geometry slice, e.g., a primitive offset parameter and a parameter for the span of consecutive primitives. The primitive offset parameter may indicate the starting point of a tessellated sub-primitive inside a patch. In some instances, a same patch may be sent more than once to a same geometry slice, such as with different offset values. Also, a primitive index based tessellator may be used in every general processing cluster (GPC) slice to generate any output primitive, e.g., based on an incoming primitive offset relative to the patch.

Figure 8:
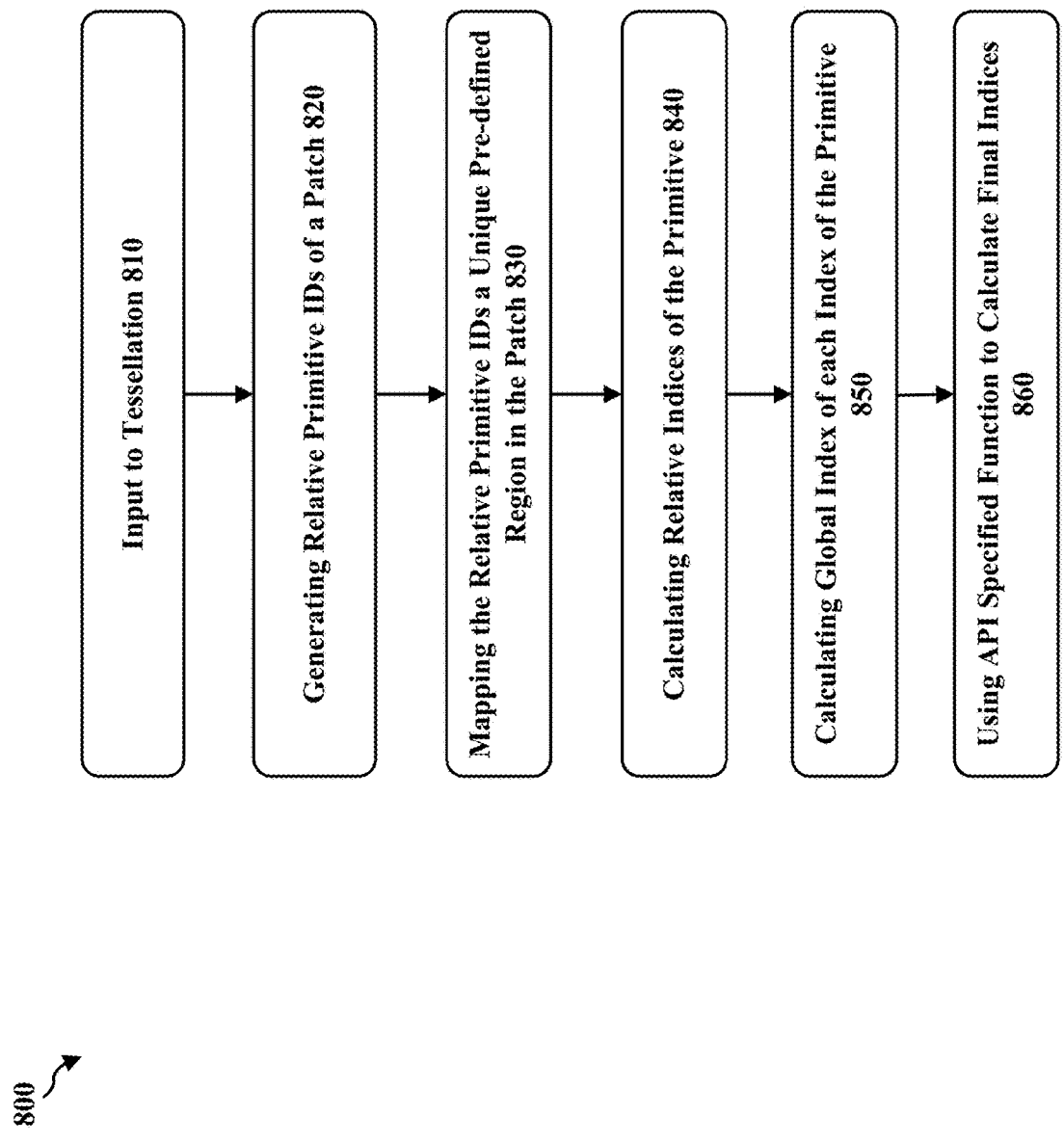
FIG. 8 is a flowchart of an example method of tessellation in accordance with one or more techniques of this disclosure.

FIG. 8 is a flowchart 800 of an example method of tessellation in accordance with one or more techniques of this disclosure. As shown in FIG. 8, diagram 800 includes steps 810, 820, 830, 840, 850, and 860. At step 810, aspects of the present disclosure may provide an input to a tessellation process. At step 820, aspects of the present disclosure may generate relative primitive identifiers (IDs) of a patch. At step 830, aspects of the present disclosure may map the relative primitive IDs of a unique pre-defined region in the patch. At step 840, aspects of the present disclosure may calculate relative indices of a primitive. At step 850, aspects of the present disclosure may calculate a global index of each index of the primitive. At step 860, aspects of the present disclosure may use an API specified function to calculate final indices.

Figure 9:
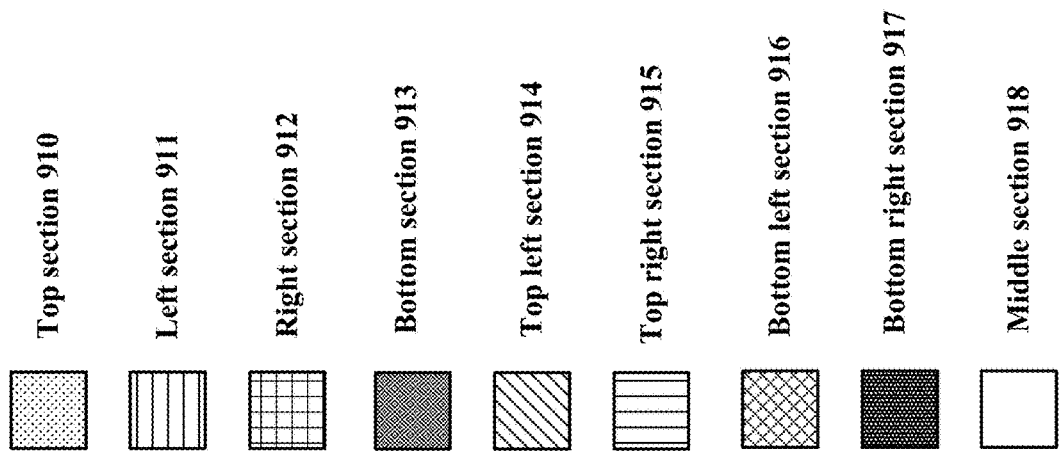
FIG. 9 is a diagram illustrating an example tessellation process of a patch of primitives in accordance with one or more techniques of this disclosure.
Figure 9:
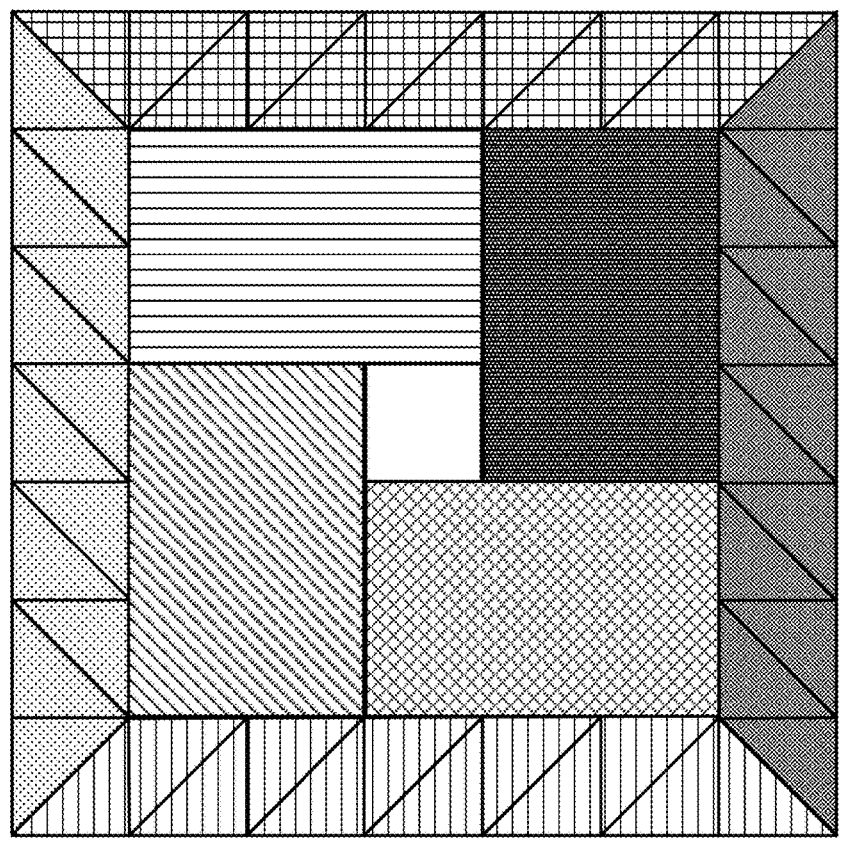

FIG. 9 is a diagram 900 illustrating an example tessellation process of a patch of primitives in accordance with one or more techniques of this disclosure. As shown in FIG. 9, diagram 900 includes a quad patch with output primitives for a tessellation process. Diagram 900 includes a number of patch sections, e.g., a top section 910, a left section 911, a right section 912, a bottom section 913, a top left section 914, a top right section 915, a bottom left section 916, a bottom right section 917, and a middle section 918. As shown in FIG. 9, there are a total of nine unique regions that are identified for the quad patch in diagram 900. The total number of primitives per region may depend upon the input parameters. Also, depending on the walk pattern, the regions may be chosen successively, i.e., one after another. The proposed algorithm may be used for any type of tessellation walk pattern.

In some instances, aspects of the present disclosure may map a relative primitive ID to a unique region in a patch. For instance, this may be represented by the following code:
//mapping RelativePrimID to unique a region in a patch
accum_sum[0]=numPrim_region[0]
for (reg=0; reg<total RegionCnt; reg++)
   accum_sum[reg]=accum_sum[reg−1]+numPrim_region [reg]
   for (reg=0; reg<total_RegionCnt; reg++)
   if (rel_primID<accum_sum[reg])
region_id=reg; break;
region_prim_idx=(region_id==0) ? rel_primID: rel_primID−accum_sum [region_id−1]
//end In some aspects, once a region primitive index (region_prim_idx) is calculated the final indices may be calculated using an existing solution. Once primitive batches are processed in a shader, they may be reordered based on the information attached to an end of each batch and sent downstream for further processing. Aspects of the present disclosure may also include a geometry shader (i.e., a uniform amplified transformation) enabled workload. For instance, taking amplification into account, each primitive may be sent to separate geometry slices with a proper offset point, which may indicate the starting index. Similar to a hull shader, for a geometry shader, a batch size may be aligned to a geometry shader amplification and a wave size (i.e., a granularity of a shader workload).

Figure 10:
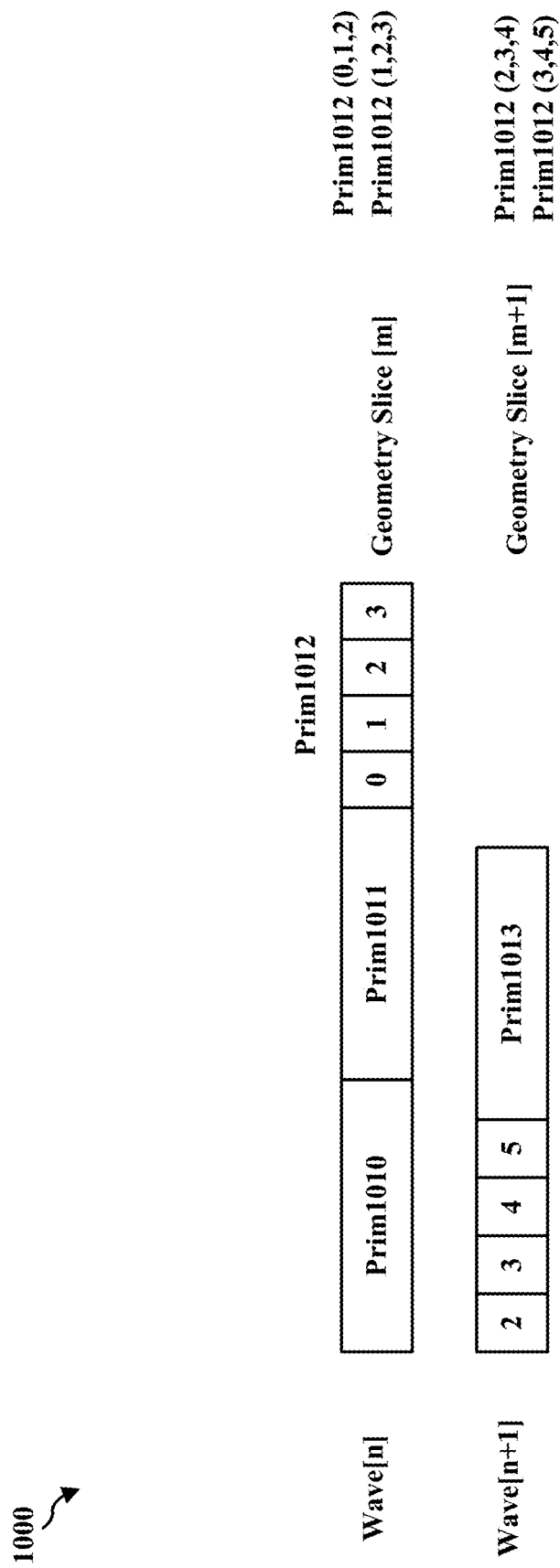
FIG. 10 is a diagram illustrating example geometry shader processing in a geometry pipeline in accordance with one or more techniques of this disclosure.

FIG. 10 is a diagram 1000 illustrating example geometry shader processing in a geometry pipeline in accordance with one or more techniques of this disclosure. As shown in FIG. 10, diagram 1000 includes multiple waves, e.g., wave [n] and wave [n+1], and multiple geometry slices, e.g., geometry slice [m] and geometry slice [m+1]. Diagram 1000 also includes multiple primitives, e.g., primitive 1010, primitive 1011, primitive 1012, and primitive 1013. As shown in FIG. 10, each of the waves, e.g., wave [n] and wave [n+1], may be sent to a different geometry slice, e.g., geometry slice [m] and geometry slice [m+1], and processed in parallel. In some aspects, without a scalable geometry pipeline, certain primitives may be stretched across multiple waves, which are processed consecutively. Further, extra offset information may be sent with each primitive for each wave, in order to indicate the starting position of geometry shader processing.

Aspects of the present disclosure may include different distribution logic for geometry shader primitives. For example, some distribution logic for geometry shader primitives may be represented by the following code:

Input:
GS_InputIdxCnt = GS Input index Count
GS_OutputAmpCnt = GS Amplification Count
WaveSize_GS = Size of a GS wave
PrimFactor = 0/1/2, depends upon GS Output connectivity -continued

```
Initialize
WaveOffset_GS to 0                                      // Offset value per
Wave
GS_CurCnt to 0                                          // Amplification
Count per Prim
CurSlice to 0                                           // GPC Slice,
rounds back to 0 once N−1 is reached
For p = 0 to every GS Prim
 if (GS_InputIdxCnt > (WaveSize_GS − WaveOffset))       // Input Idx of
Prim not fit in current Wave, start from next
 CurSlice =+ 1
 WaveOffset = 0
 For w = 0 to GS_OutputAmpCnt
  if w between GS_CurCnt to ((GS_CurCnt + (WaveSize_GS − 1) − Wave_Offset)
   Send to Slice[CurSlice]
    if (w == GS_OutputAmpCnt)
      Update Wave_Offset based on occupied Wave GS slots
      Break
  if w between ((GS_CurCnt + (WaveSize_GS − PrimFactor) − Wave_Offset)
to ((GS_CurCnt + WaveSize_GS − 1) − Wave_Offset)
     & (w + PrimFactor < GS_OutputAmpCnt)               // Repeat
vertices to next wave
   Send to Slice[CurSlice + 1]
 CurSlice =+ 1
 Wave_Offset = 0
 GS_CurCnt =+((WaveSize − Wave_Offset)
```

Aspects of the present disclosure may also include visibility handling (e.g., tiled rendering) across multiple geometry slices. In some instances, a central index fetch may support visibility stream based primitive dropping (i.e., a bin rendering pass) before an index is distributed to geometry slices. Accordingly, visible primitives may be considered as a valid workload, and may fit with the workload distribution scheme for a normal execution.

Additionally, aspects of the present disclosure may support a primitive restart. In a central index fetch, all fetched indices may be checked for a presence of a restart index. If found, subsequent primitives may be sent to the same geometry slice until the end of a drawcall and primitive processing may be scaled down to a single slice output. This may ensure that an overhead of restart index handling is removed. In aspects of the present disclosure, a centralized index fetch and distribution may allow for dynamically handling the re-start index cases even without an API hint and/or without any redundant index fetches.

As indicated herein, aspects of the present disclosure may include a number of benefits or advantages. For instance, with the proposed scalable geometry pipeline architecture of the present disclosure, there may be a performance benefit for processing multiple geometry slices (i.e., supporting multiple primitives/elk). For example, aspects of the present disclosure may experience a certain performance gain, e.g., a 2.61% gain, a 2.80% gain, or an 8.50% gain, when processing multiple geometry slices.

Figure 11:
FIG. 11 is a communication flow diagram illustrating example communications between a GPU pipeline, a GPU component, and a memory/display in accordance with one or more techniques of this disclosure.

FIG. 11 is a communication flow diagram 1100 of graphics processing in accordance with one or more techniques of this disclosure. As shown in FIG. 11, diagram 1100 includes example communications between GPU pipeline 1102, GPU component 1104, and memory or display 1106, in accordance with one or more techniques of this disclosure.

At 1110, GPU pipeline 1102 may determine a visibility of each of a plurality of primitives, where a plurality of indices for each of the plurality of primitives is received based on the visibility of each of the plurality of primitives.

At 1120, GPU pipeline 1102 may receive a plurality of indices, e.g., indices 1122, for each of a plurality of primitives. The apparatus may also fetch the plurality of indices, e.g., indices 1122, for each of the plurality of primitives. For example, receiving the plurality of indices, e.g., indices 1122, for each of a plurality of primitives may comprise fetching the plurality of indices for each of the plurality of primitives. In some instances, each of the plurality of indices may be associated with a primitive restart index. Also, the distribution of each of the plurality of primitive batches to each of the plurality of geometry slices may be based on the primitive restart index associated with each of the plurality of indices.

At 1130, GPU pipeline 1102 may determine a size of each of a plurality of primitive batches, each of the plurality of primitive batches including at least one primitive of the plurality of primitives. In some aspects, the size of each of the plurality of primitive batches may be determined based on at least one of a size of at least one drawcall, a size of at least one work item, or an adjustment to a size of at least one of the plurality of primitives. Also, the size of each of the plurality of primitive batches may be based on one or more parameters including at least one of one or more tessellation factors, at least one primitive offset, or a span of one or more consecutive primitives. Further, each of the plurality of primitive batches may include a start indication and an end indication, the start indication corresponding to a start of the primitive batch and the end indication corresponding to an end of the primitive batch.

At 1140, GPU pipeline 1102 may divide, based on the determined size of each of the plurality of primitive batches, the plurality of primitives into the plurality of primitive batches.

At 1150, GPU pipeline 1102 may distribute each of the plurality of primitive batches to each of a plurality of geometry slices, each of the plurality of geometry slices including one or more primitives of the plurality of primitives.

At 1160, GPU pipeline 1102 may process each of the plurality of geometry slices including the one or more primitives. The apparatus may also shade each of the plurality of geometry slices including the one or more primitives. For example, processing each of the plurality of geometry slices may comprise shading each of the plurality of geometry slices including the one or more primitives. In some instances, each of the plurality of geometry slices may be processed by at least one of a vertex shader, a geometry shader, a domain shader, or a tessellator. The tessellator may be configured to process a geometry for each of the plurality of geometry slices. Also, the tessellator may be a primitive index based tessellator.

In some aspects, the plurality of geometry slices may be arranged in a slice order, where each of the plurality of geometry slices may correspond to a position in the slice order. At 1170, GPU pipeline 1102 may rearrange a slice order of the plurality of geometry slices, such that at least one of the plurality of geometry slices corresponds to an updated position in the slice order.

At 1180, GPU pipeline 1102 may rasterize each of the plurality of primitives, e.g., primitives 1182, based on the slice order of the plurality of geometry slices. After rasterizing the each of the plurality of primitives, e.g., primitives 1182, the primitives may be transmitted to another component of a GPU, e.g., memory 1106, or a display, e.g., display 1106. For example, each of the rasterized plurality of primitives, e.g., primitives 1182, may be rendered by a graphics processing unit (GPU).

Figure 12:
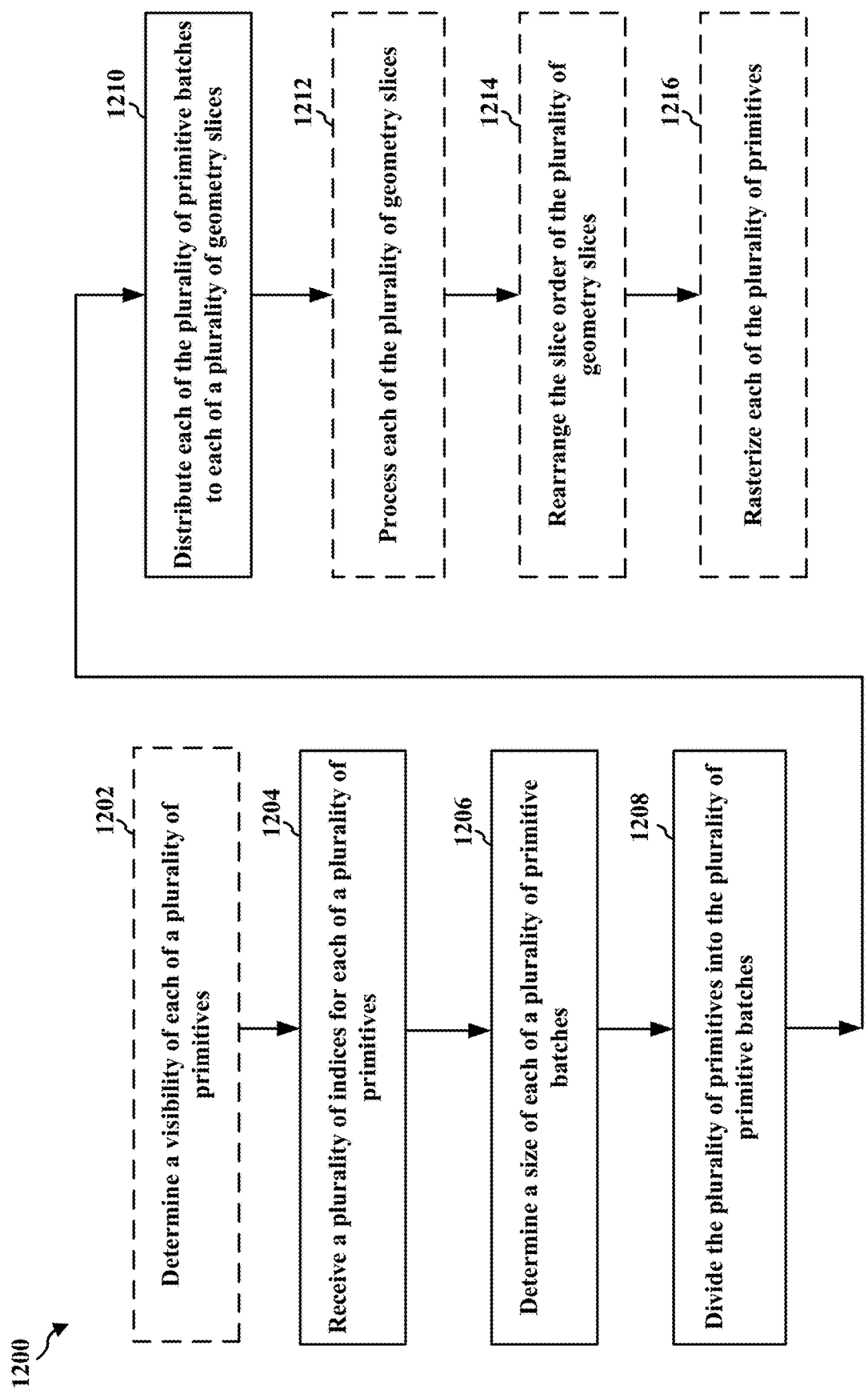
FIG. 12 is a flowchart of an example method of graphics processing in accordance with one or more techniques of this disclosure.

FIG. 12 is a flowchart 1200 of an example method of graphics processing in accordance with one or more techniques of this disclosure. The method may be performed by an apparatus, such as an apparatus for graphics processing, a GPU, another graphics processor, a GPU pipeline, a wireless communication device, and/or any apparatus that can perform graphics processing as used in connection with the examples of FIGS. 1-11.

At 1202, the apparatus may determine a visibility of each of a plurality of primitives, where a plurality of indices for each of the plurality of primitives is received based on the visibility of each of the plurality of primitives, as described in connection with the examples in FIGS. 1-11. For example, GPU pipeline 1102 may determine a visibility of each of a plurality of primitives, where a plurality of indices for each of the plurality of primitives is received based on the visibility of each of the plurality of primitives. Further, processing unit 120 may perform 1202.

At 1204, the apparatus may receive a plurality of indices for each of a plurality of primitives, as described in connection with the examples in FIGS. 1-11. For example, GPU pipeline 1102 may receive a plurality of indices for each of a plurality of primitives. Further, processing unit 120 may perform 1204. The apparatus may also fetch the plurality of indices for each of the plurality of primitives. For example, receiving the plurality of indices for each of a plurality of primitives may comprise fetching the plurality of indices for each of the plurality of primitives. In some instances, each of the plurality of indices may be associated with a primitive restart index. Also, the distribution of each of the plurality of primitive batches to each of the plurality of geometry slices may be based on the primitive restart index associated with each of the plurality of indices.

At 1206, the apparatus may determine a size of each of a plurality of primitive batches, each of the plurality of primitive batches including at least one primitive of the plurality of primitives, as described in connection with the examples in FIGS. 1-11. For example, GPU pipeline 1102 may determine a size of each of a plurality of primitive batches, each of the plurality of primitive batches including at least one primitive of the plurality of primitives. Further, processing unit 120 may perform 1206.

In some aspects, the size of each of the plurality of primitive batches may be determined based on at least one of a size of at least one drawcall, a size of at least one work item, or an adjustment to a size of at least one of the plurality of primitives. Also, the size of each of the plurality of primitive batches may be based on one or more parameters including at least one of one or more tessellation factors, at least one primitive offset, or a span of one or more consecutive primitives. Further, each of the plurality of primitive batches may include a start indication and an end indication, the start indication corresponding to a start of the primitive batch and the end indication corresponding to an end of the primitive batch.

At 1208, the apparatus may divide, based on the determined size of each of the plurality of primitive batches, the plurality of primitives into the plurality of primitive batches, as described in connection with the examples in FIGS. 1-11. For example, GPU pipeline 1102 may divide, based on the determined size of each of the plurality of primitive batches, the plurality of primitives into the plurality of primitive batches. Further, processing unit 120 may perform 1208.

At 1210, the apparatus may distribute each of the plurality of primitive batches to each of a plurality of geometry slices, each of the plurality of geometry slices including one or more primitives of the plurality of primitives, as described in connection with the examples in FIGS. 1-11. For example, GPU pipeline 1102 may distribute each of the plurality of primitive batches to each of a plurality of geometry slices, each of the plurality of geometry slices including one or more primitives of the plurality of primitives. Further, processing unit 120 may perform 1210.

At 1212, the apparatus may process each of the plurality of geometry slices including the one or more primitives, as described in connection with the examples in FIGS. 1-11. For example, GPU pipeline 1102 may process each of the plurality of geometry slices including the one or more primitives. Further, processing unit 120 may perform 1212. The apparatus may also shade each of the plurality of geometry slices including the one or more primitives. For example, processing each of the plurality of geometry slices may comprise shading each of the plurality of geometry slices including the one or more primitives. In some instances, each of the plurality of geometry slices may be processed by at least one of a vertex shader, a geometry shader, a domain shader, or a tessellator. The tessellator may be configured to process a geometry for each of the plurality of geometry slices. Also, the tessellator may be a primitive index based tessellator.

In some aspects, the plurality of geometry slices may be arranged in a slice order, where each of the plurality of geometry slices may correspond to a position in the slice order. At 1214, the apparatus may rearrange a slice order of the plurality of geometry slices, such that at least one of the plurality of geometry slices corresponds to an updated position in the slice order, as described in connection with the examples in FIGS. 1-11. For example, GPU pipeline 1102 may rearrange a slice order of the plurality of geometry slices, such that at least one of the plurality of geometry slices corresponds to an updated position in the slice order. Further, processing unit 120 may perform 1214.

At 1216, the apparatus may rasterize each of the plurality of primitives based on the slice order of the plurality of geometry slices, as described in connection with the examples in FIGS. 1-11. For example, GPU pipeline 1102 may rasterize each of the plurality of primitives based on the slice order of the plurality of geometry slices. Further, processing unit 120 may perform 1216. After rasterizing the each of the plurality of primitives, the primitives may be transmitted to another component of a GPU or a display. For example, each of the rasterized plurality of primitives may be rendered by a graphics processing unit (GPU).

In configurations, a method or an apparatus for graphics processing is provided. The apparatus may be a GPU, a graphics processor, or some other processor that may perform graphics processing. In aspects, the apparatus may be the processing unit 120 within the device 104, or may be some other hardware within the device 104 or another device. The apparatus, e.g., processing unit 120, may include means for receiving a plurality of indices for each of a plurality of primitives; means for determining a size of each of a plurality of primitive batches, each of the plurality of primitive batches including at least one primitive of the plurality of primitives; means for dividing, based on the determined size of each of the plurality of primitive batches, the plurality of primitives into the plurality of primitive batches; means for distributing each of the plurality of primitive batches to each of a plurality of geometry slices, each of the plurality of geometry slices including one or more primitives of the plurality of primitives; means for determining a visibility of each of the plurality of primitives, where the plurality of indices for each of a plurality of primitives is received based on the visibility of each of the plurality of primitives; means for fetching the plurality of indices for each of the plurality of primitives; means for processing each of the plurality of geometry slices including the one or more primitives; means for shading each of the plurality of geometry slices including the one or more primitives; means for rearranging the slice order of the plurality of geometry slices, such that at least one of the plurality of geometry slices corresponds to an updated position in the slice order; and means for rasterizing each of the plurality of primitives based on the slice order of the plurality of geometry slices.

The subject matter described herein can be implemented to realize one or more benefits or advantages. For instance, the described graphics processing techniques can be used by a GPU, a graphics processor, or some other processor that can perform graphics processing to implement the scalable primitive rate architecture techniques described herein. This can also be accomplished at a low cost compared to other graphics processing techniques. Moreover, the graphics processing techniques herein can improve or speed up data processing or execution. Further, the graphics processing techniques herein can improve resource or data utilization and/or resource efficiency. Additionally, aspects of the present disclosure can utilize scalable primitive rate architecture in order to improve memory bandwidth and/or reduce performance overhead at a GPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is a method of graphics processing. The method includes receiving a plurality of indices for each of a plurality of primitives; determining a size of each of a plurality of primitive batches, each of the plurality of primitive batches including at least one primitive of the plurality of primitives; dividing, based on the determined size of each of the plurality of primitive batches, the plurality of primitives into the plurality of primitive batches; and distributing each of the plurality of primitive batches to each of a plurality of geometry slices, each of the plurality of geometry slices including one or more primitives of the plurality of primitives.

Aspect 2 is the method of aspect 1, further including determining a visibility of each of the plurality of primitives, where the plurality of indices for each of a plurality of primitives is received based on the visibility of each of the plurality of primitives.

Aspect 3 is the method of any of aspects 1 and 2, where receiving the plurality of indices for each of a plurality of primitives includes fetching the plurality of indices for each of the plurality of primitives.

Aspect 4 is the method of any of aspects 1 to 3, where each of the plurality of indices is associated with a primitive restart index.

Aspect 5 is the method of any of aspects 1 to 4, where the distribution of each of the plurality of primitive batches to each of the plurality of geometry slices is based on the primitive restart index associated with each of the plurality of indices.

Aspect 6 is the method of any of aspects 1 to 5, further including processing each of the plurality of geometry slices including the one or more primitives.

Aspect 7 is the method of any of aspects 1 to 6, where processing each of the plurality of geometry slices includes shading each of the plurality of geometry slices including the one or more primitives.

Aspect 8 is the method of any of aspects 1 to 7, where each of the plurality of geometry slices is processed by at least one of a vertex shader, a geometry shader, a domain shader, or a tessellator.

Aspect 9 is the method of any of aspects 1 to 8, where the tessellator is configured to process a geometry for each of the plurality of geometry slices.

Aspect 10 is the method of any of aspects 1 to 9, where the tessellator is a primitive index based tessellator.

Aspect 11 is the method of any of aspects 1 to 10, where the plurality of geometry slices is arranged in a slice order, each of the plurality of geometry slices corresponding to a position in the slice order.

Aspect 12 is the method of any of aspects 1 to 11, further including rearranging the slice order of the plurality of geometry slices, such that at least one of the plurality of geometry slices corresponds to an updated position in the slice order.

Aspect 13 is the method of any of aspects 1 to 12, further including rasterizing each of the plurality of primitives based on the slice order of the plurality of geometry slices.

Aspect 14 is the method of any of aspects 1 to 13, where each of the rasterized plurality of primitives is rendered by a graphics processing unit (GPU).

Aspect 15 is the method of any of aspects 1 to 14, where the size of each of the plurality of primitive batches is determined based on at least one of a size of at least one drawcall, a size of at least one work item, or an adjustment to a size of at least one of the plurality of primitives.

Aspect 16 is the method of any of aspects 1 to 15, where the size of each of the plurality of primitive batches is based on one or more parameters including at least one of one or more tessellation factors, at least one primitive offset, or a span of one or more consecutive primitives.

Aspect 17 is the method of any of aspects 1 to 16, where each of the plurality of primitive batches includes a start indication and an end indication, the start indication corresponding to a start of the primitive batch and the end indication corresponding to an end of the primitive batch.

Aspect 18 is an apparatus for graphics processing including at least one processor coupled to a memory and configured to implement a method as in any of aspects 1 to 17.

Aspect 19 is an apparatus for graphics processing including means for implementing a method as in any of aspects 1 to 17.

Aspect 20 is a computer-readable medium storing computer executable code, the code when executed by at least one processor causes the at least one processor to implement a method as in any of aspects 1 to 17.

What is claimed is:

1. A method of graphics processing, comprising:
determining a visibility of each of a plurality of primitives;
receiving a plurality of indices for each of the plurality of primitives, wherein the plurality of indices for each of the plurality of primitives is received based on the visibility of each of the plurality of primitives;
determining a size of each of a plurality of primitive batches, each of the plurality of primitive batches including at least one primitive of the plurality of primitives;
dividing, based on the determined size of each of the plurality of primitive batches, the plurality of primitives into the plurality of primitive batches;
distributing each of the plurality of primitive batches to each of a plurality of geometry slices, each of the plurality of geometry slices including one or more primitives of the plurality of primitives;
processing each of the plurality of geometry slices including the one or more primitives, wherein the plurality of geometry slices is arranged in a slice order, each of the plurality of geometry slices corresponding to a position in the slice order; and
rasterizing each of the plurality of primitives based on the slice order of the plurality of geometry slices.

2. The method of claim 1, wherein receiving the plurality of indices for each of the plurality of primitives comprises:
fetching the plurality of indices for each of the plurality of primitives.

3. The method of claim 1, wherein each of the plurality of indices is associated with a primitive restart index.

4. The method of claim 3, wherein the distribution of each of the plurality of primitive batches to each of the plurality of geometry slices is based on the primitive restart index associated with each of the plurality of indices.

5. The method of claim 1, wherein processing each of the plurality of geometry slices comprises:
shading each of the plurality of geometry slices including the one or more primitives.

6. The method of claim 1, wherein each of the plurality of geometry slices is processed by at least one of a vertex shader, a geometry shader, a domain shader, or a tessellator.

7. The method of claim 6, wherein the tessellator is configured to process a geometry for each of the plurality of geometry slices.

8. The method of claim 6, wherein the tessellator is a primitive index based tessellator.

9. The method of claim 1, further comprising:
rearranging the slice order of the plurality of geometry slices, such that at least one of the plurality of geometry slices corresponds to an updated position in the slice order.

10. The method of claim 1, wherein each of the rasterized plurality of primitives is rendered by a graphics processing unit (GPU).

11. The method of claim 1, wherein the size of each of the plurality of primitive batches is determined based on at least one of a size of at least one drawcall, a size of at least one work item, or an adjustment to a size of at least one of the plurality of primitives.

12. The method of claim 1, wherein the size of each of the plurality of primitive batches is based on one or more parameters including at least one of one or more tessellation factors, at least one primitive offset, or a span of one or more consecutive primitives.

13. The method of claim 1, wherein each of the plurality of primitive batches includes a start indication and an end indication, the start indication corresponding to a start of the primitive batch and the end indication corresponding to an end of the primitive batch.

14. An apparatus for graphics processing, comprising:
a memory; and
at least one processor coupled to the memory and configured to:
determine a visibility of each of a plurality of primitives;
receive a plurality of indices for each of the plurality of primitives, wherein the plurality of indices for each of the plurality of primitives is received based on the visibility of each of the plurality of primitives;
determine a size of each of a plurality of primitive batches, each of the plurality of primitive batches including at least one primitive of the plurality of primitives;
divide, based on the determined size of each of the plurality of primitive batches, the plurality of primitives into the plurality of primitive batches;
distribute each of the plurality of primitive batches to each of a plurality of geometry slices, each of the plurality of geometry slices including one or more primitives of the plurality of primitives;
process each of the plurality of geometry slices including the one or more primitives, wherein the plurality of geometry slices is arranged in a slice order, each of the plurality of geometry slices corresponding to a position in the slice order; and
rasterize each of the plurality of primitives based on the slice order of the plurality of geometry slices.

15. The apparatus of claim 14, wherein to receive the plurality of indices for each of the plurality of primitives, the at least one processor is configured to:
fetch the plurality of indices for each of the plurality of primitives.

16. The apparatus of claim 14, wherein each of the plurality of indices is associated with a primitive restart index.

17. The apparatus of claim 16, wherein the distribution of each of the plurality of primitive batches to each of the plurality of geometry slices is based on the primitive restart index associated with each of the plurality of indices.

18. The apparatus of claim 14, wherein to process each of the plurality of geometry slices, the at least one processor is configured to:
shade each of the plurality of geometry slices including the one or more primitives.

19. The apparatus of claim 14, wherein the at least one processor is configured to process each of the plurality of geometry slices with at least one of a vertex shader, a geometry shader, a domain shader, or a tessellator.

20. The apparatus of claim 19, wherein the tessellator is configured to process a geometry for each of the plurality of geometry slices.

21. The apparatus of claim 19, wherein the tessellator is a primitive index based tessellator.

22. The apparatus of claim 14, wherein the at least one processor is further configured to:

rearrange the slice order of the plurality of geometry slices, such that at least one of the plurality of geometry slices corresponds to an updated position in the slice order.

23. The apparatus of claim 14, wherein each of the rasterized plurality of primitives is rendered by a graphics processing unit (GPU).

24. The apparatus of claim 14, wherein the at least one processor is configured to determine the size of each of the plurality of primitive batches based on at least one of a size of at least one drawcall, a size of at least one work item, or an adjustment to a size of at least one of the plurality of primitives.

25. The apparatus of claim 14, wherein the size of each of the plurality of primitive batches is based on one or more parameters including at least one of one or more tessellation factors, at least one primitive offset, or a span of one or more consecutive primitives.

26. The apparatus of claim 14, wherein each of the plurality of primitive batches includes a start indication and an end indication, the start indication corresponding to a start of the primitive batch and the end indication corresponding to an end of the primitive batch.

27. An apparatus for graphics processing, comprising:
means for determining a visibility of each of a plurality of primitives;
means for receiving a plurality of indices for each of the plurality of primitives, wherein the plurality of indices for each of the plurality of primitives is received based on the visibility of each of the plurality of primitives;
means for determining a size of each of a plurality of primitive batches, each of the plurality of primitive batches including at least one primitive of the plurality of primitives;
means for dividing, based on the determined size of each of the plurality of primitive batches, the plurality of primitives into the plurality of primitive batches;
means for distributing each of the plurality of primitive batches to each of a plurality of geometry slices, each of the plurality of geometry slices including one or more primitives of the plurality of primitives;
means for processing each of the plurality of geometry slices including the one or more primitives, wherein the plurality of geometry slices is arranged in a slice order, each of the plurality of geometry slices corresponding to a position in the slice order; and
means for rasterizing each of the plurality of primitives based on the slice order of the plurality of geometry slices.

28. A non-transitory computer-readable medium storing computer executable code for graphics processing, the code when executed by a processor causes the processor to:
determine a visibility of each of a plurality of primitives;
receive a plurality of indices for each of the plurality of primitives, wherein the plurality of indices for each of the plurality of primitives is received based on the visibility of each of the plurality of primitives;
determine a size of each of a plurality of primitive batches, each of the plurality of primitive batches including at least one primitive of the plurality of primitives;
divide, based on the determined size of each of the plurality of primitive batches, the plurality of primitives into the plurality of primitive batches; and
distribute each of the plurality of primitive batches to each of a plurality of geometry slices, each of the plurality of geometry slices including one or more primitives of the plurality of primitives;
process each of the plurality of geometry slices including the one or more primitives, wherein the plurality of geometry slices is arranged in a slice order, each of the plurality of geometry slices corresponding to a position in the slice order; and
rasterize each of the plurality of primitives based on the slice order of the plurality of geometry slices.

\* \* \* \* \*